Oct. 10, 1950  V. J. CLARKE  2,525,448
PHASE INDICATING INSTRUMENT
Filed Sept. 1, 1945
Fig. 1.
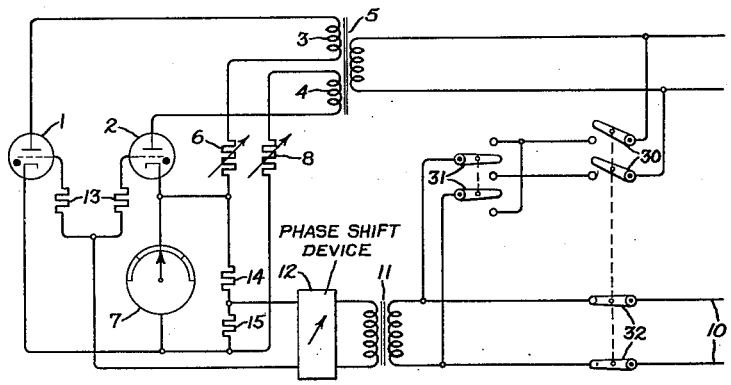
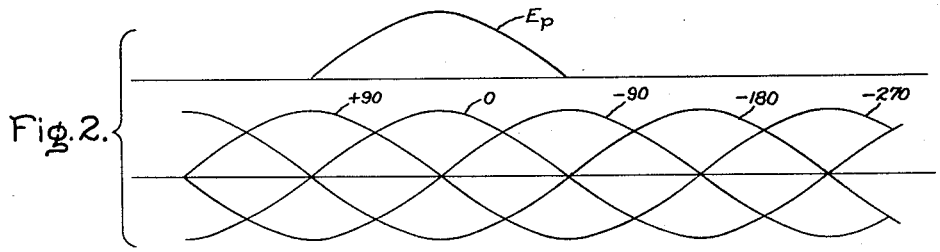
Fig. 2.
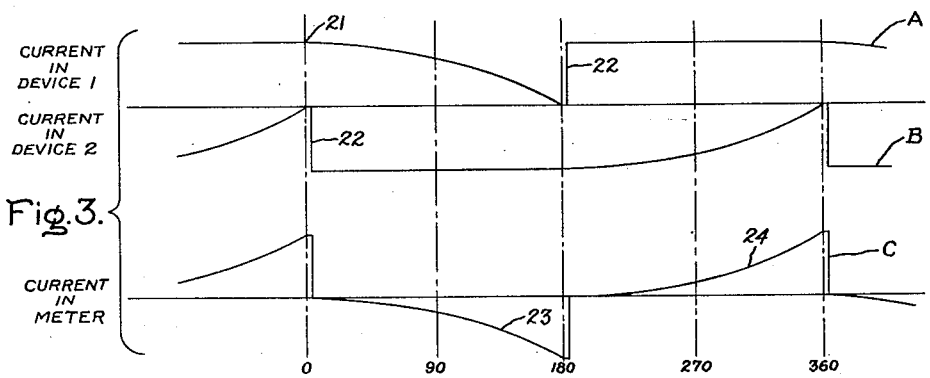
Fig. 3.
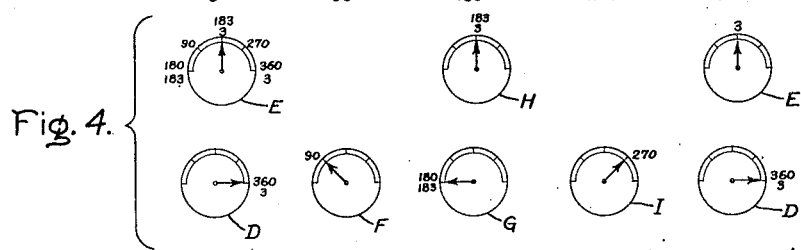
Fig. 4.
Inventor:
Varro J. Clarke,
by Merton D. Morse
His Attorney.

Patented Oct. 10, 1950

2,525,448

UNITED STATES PATENT OFFICE 2,525,448

PHASE INDICATING INSTRUMENT

Varro J. Clarke, Schenectady, N. Y., assignor to General Electric Company, a corporation of New York Application September 1, 1945, Serial No. 614,081

9 Claims. (Cl. 172—245)

My invention relates to phase indicating instruments.

It has for one of its objects to provide improved means for indicating the phase relation between two alternating voltages throughout three hundred and sixty degrees of said variation.

A further object of my invention is to utilize the properties of gaseous conduction devices to produce such indication.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 represents an embodiment of my invention; Fig. 2 represents the relation between grid and anode voltages employed therein: Fig. 3 represents certain further characteristics thereof; and Fig. 4 represents the character of indication produced.

Referring to Fig. 1 of the drawing, I have illustrated therein a pair of gaseous conduction discharge devices or thyratrons 1 and 2 having alternating voltage supplied between the anodes and cathodes thereof from respective secondary windings 3 and 4 of a transformer 5 to the primary winding of which alternating voltage is supplied. The anode circuit of the gaseous conduction device 1 includes the secondary winding 3, a resistance 6, and a meter 7. The anode circuit of the device 2 comprises the winding 4, a resistance 8 and the meter 7. The meter 7 is thus connected oppositely in the two circuits so that the current from one device flows through the meter in the opposite direction from which the current in the other device flows therein.

The voltage of which the phase relation, with respect to the voltage supplied to the transformer 5, is to be determined, is impressed between conductors 10 and across the primary winding of a transformer 11. The secondary voltage of this transformer 11 is supplied through a variable phase shift device 12 between the grid and cathodes of the two devices. The output circuit of this device 12 has one terminal connected at a point between two resistances 14 and 15, which are of equal value, and which are connected in series with each other across the meter 7. The other terminal of this output circuit is connected through grid current limiting resistors 13 to the respective control electrodes.

It will thus be observed that while the anode voltage on the two devices 1 and 2 is in opposite phase the grid voltage is supplied to the two devices in phase.

It will also be observed that the current flowing in instrument 7 is equal to the difference in currents flowing between the anode and cathode of the two devices. This instrument, preferably, is one which responds both to the polarity and intensity of these currents so that it deflects to the right in response to current of one polarity and to the left in response to current of the other polarity and deflection from the center position is proportioned to the average magnitude of the current of the respective polarity.

As is of course well understood with respect to gaseous conduction devices, the current flowing therein is determined by the anode voltage and once it has started to flow it is not subject to control by the potential between the grid and cathode. The grid voltage, however, controls the starting of this current. If at the beginning of the half cycle when the anode is positive the grid voltage is negative, current will not flow in the anode circuit until the negative grid voltage has been reduced to a value sufficient to permit anode current to flow and thereafter anode current flows for the remaining portion of the positive half cycle of anode voltage with an intensity determined by the anode voltage.

Thus if the grid voltage is the same frequency as the anode voltage, the average current in the anode circuit is dependent upon the time in the positive half cycle of anode voltage when the grid voltage is reduced sufficiently to permit current to pass in the anode circuit.

Thus, for example referring to Fig. 2, if we consider that the curve $E_p$ represents the anode voltage on one of the gaseous conduction devices shown in Fig. 1 and the curve 0 represents the grid voltage on the same device, current will flow in the device throughout the entire half cycle of the curve $E_p$. Moreover, if the grid voltage represented by the curve 0 be shifted to the left, as represented by the curve +90, the average value of anode current does not change because the grid continues to be positive at the beginning of the half cycle represented by the curve $E_p$ and the current flows throughout the entire half cycle. This condition continues if the phase relation be shifted in the same direction through practically 180°.

However, if the grid voltage represented by the curve 0 be shifted to the right, then the grid becomes negative at the beginning of the half cycle and current does not start to flow in the gaseous conduction device until a later time in the half cycle dependent upon the degree of the shift. Thus, if the grid voltage be shifted from the position represented by the curve 0 to that represented by the curve −90, current does not flow in the discharge device until a time substantially at the middle of the positive half cycle of anode voltage. Thus the average value of the anode current varies from its maximum value to zero as the phase relation is shifted from that represented by the curve 0 to that represented by the curve 180.

The manner in which current in the two devices varies with variation in the phase relation between the grid and anode voltages is represented by the curves A and B of Fig. 3. The curve A may be taken to represent the current in the anode circuit of device 1 and the curve B the current in the anode circuit of device 2. These curves are plotted against phase relation between the grid and anode voltages as abscissa. When the phase relation on device 1 is that indicated by the curves $E_p$ and the curve 0 of Fig. 2, the current in that device is maximum as indicated at the point 21 on the curve A and the current in the other device is 0. If the curve 0 of Fig. 2 be shifted to the left toward the +90 curve of Fig. 2, no change in this magnitude of current in device 1 occurs. This is indicated by the horizontal portion of curve A to the left of point 21. If it be shifted to the right toward the curve −90 of Fig. 2, the current in the anode circuit gradually reduces as indicated by the curve A until it becomes zero when the phase relation represented by curve 180 is obtained. At this point the grid voltage at the beginning of the positive half cycle of anode voltage is 0. Upon a slight further shift, however, the anode current again starts to flow at the beginning of the half cycle and flows with full magnitude dependent upon the anode voltage. This is represented by abrupt rise 22 in the curve A. The anode current then remains substantially constant throughout a further shift in the same direction to the completion of the 360° phase shift.

The anode current in the other device varies with respect to phase relation between the grid and anode voltages in the same way but in opposite phase as indicated by the curve B of Fig. 3.

The curve C of Fig. 3 represents the current in the meter 7, this being the difference in currents represented by curves A and B.

The abrupt rise in current in the two devices represented at 22 on the curves A and B may be taken to occur when the grid voltage of the respective device at the beginning of the positive half cycle of anode voltage is slightly negative or at a time approximately 3° away from the opposing phase relation of the grid and anode voltages. That is, in the direction in which the grid becomes increasingly positive at the beginning of the positive half cycle of anode voltage.

Fig. 4 represents the character of indication produced by the meter 7 for different phase relations between the voltage impressed on conductors 10 and that impressed on the primary transformer 5. When the grid and anode voltages are in phase as indicated by curves $E_p$ and 0 of Fig. 2, the meter indication appears as indicated at D in Fig. 4. It will be seen that the deflection is to the right to the extreme end of the scale since the current in one device is zero as indicated by the curve B and in the other device it is maximum as indicated by the point 21 on the curve A. This indication remains as the voltage is shifted through the first three degrees, for example. Thereafter, the current represented by the curve B abruptly increases to its maximum value as indicated by the point 22 on the curve B, this current flowing in the instrument in opposite direction to the current represented by the curve A and the meter indication changes to that indicated at E in Fig. 4. Upon further shift in phase, the current represented by the curve A gradually decreases while that represented by the curve B remains constant with the result that the current in the instrument gradually increases as represented by the portion 23 of the curve C until the shift is attained at 180°. This current is of polarity opposite to that indicated at D by the instrument. Thus the indication of the instrument changes progressively from that indicated at E to that indicated at F and G. At this point the current represented by the curve A is zero and that represented by the curve B is maximum, this condition substantially continuing through the next three degrees where the current represented by the curve A abruptly increases as indicated at 22 in the curve A. The meter indication then changes to that indicated at H. Upon further shift the current indicated by the curve A remains constant and that represented by the curve B decreases causing the current in the instrument to vary as indicated by the portion 24 of the curve C, this current being of opposite polarity to that indicated by the portions 23 of curve C. The meter indication then changes from that indicated at H to that indicated at I and finally that indicated at D. Thereafter the cycle continues through further shifts in the phase.

Thus as the phase is varied from the in-phase relation throughout 360° the meter indication changes from a maximum abruptly to zero and then gradually increases in one direction to a maximum where it again abruptly drops to zero and then progressively increases in the opposite direction to a maximum, this cycle continuing throughout further shifts in the same direction.

It will be observed that every indication of the instrument for any phase relation of the two voltages is different from the indication of every other phase relation except for the indications indicated at E and H. To distinguish the phase relation represented by the indications illustrated at E and H, the phase adjustment device 12 is employed. By variation of the phase of the voltage applied to the control electrodes through a narrow range the indication of the instrument may be changed. If it be varied in one direction, the needle deflects abruptly to the right as indicated at D and the indication is that the voltages are in phase. If, on the other hand, the needle goes abruptly to the left as indicated at G, the two voltages are 180° out of phase.

Sometimes in calibrating the instrument it is desirable to apply to the control electrodes of the two devices a voltage of known phase relation and which is readily reversible in phase. For this reason, switches 30, 31 and 32 are employed. Switches 30 and 32 may be arranged for unicontrol, switch 32 to interrupt the connection to the circuit 10 and the switch 30 simultaneously to connect the transformer 11 to the primary winding of transformer 5 thereby to supply to the transformer 11 voltage of known phase relation. Switch 31 may then be operated to reverse this phase relation if desired during the calibration process.

While I have shown a particular embodiment of my invention it will of course be understood that I do not wish to be limited thereto since different modifications both in the circuit arrangement and the structures employed may be made and I contemplate by the appended claims to cover any such modifications as fall within the true spirit and scope of my invention.

What I claim as new and desire to secure by Letters Patent of the United States, is:

1. In a phase indicating device, a pair of gaseous conduction devices, each having an anode, a cathode, and a control electrode, means to supply a first alternating voltage between the anode and cathode of both of said devices in opposite phase, means to supply a second alternating voltage of the same frequency, and whose phase relationship to said first alternating voltage is to be determined, between said cathode and control electrode of both of said devices in phase, one of said last alternating voltages being variable in phase throughout a range greater than one hundred and eighty degrees, and a current measuring instrument responsive to the difference in average current in said two devices to indicate the phase relation between said voltages throughout said range, said instrument having an index member having different positions corresponding to different values of current therein, said positions corresponding to the different phase relations between said voltages.

2. In a phase indicating device, a pair of gaseous conduction devices, each having an anode, a cathode, and a control electrode, means to supply alternating voltage between the anode and cathode of both devices in opposite phase, means to supply alternating voltage between the grid and cathode of both devices in phase, said last voltage having the same frequency as said first voltage, and having phase relation thereto variable through the greater part of a cycle, a current measuring instrument responsive to the difference in average current flowing between the anodes and cathodes of said two devices thereby to indicate said phase relation, and means to vary said phase relation through a narrow range, said instrument having an index member having different positions corresponding to different values of current therein, said positions corresponding to the different phase relations between said voltages.

3. In a phase indicating device, a pair of gaseous conduction devices, each having an anode, a cathode, and a control electrode, means to supply a first alternating voltage between the anode and cathode of both of said devices in opposite phase, means to supply a second alternating voltage of the same frequency between said cathode and control electrode of both of said devices in phase, said last alternating voltage being variable in phase throughout a range greater than one hundred and eighty degrees, and a current measuring instrument connected oppositely in the anode circuits of both of said devices adapted to produce an indication in accord with the intensity and polarity of current flowing therein, said instrument having an index member having different positions corresponding to different values of current therein, said positions corresponding to the different phase relations between said voltages.

4. In a phase indicating device, the combination of a pair of electronic conduction devices, each having an anode, a cathode, and a control electrode, a circuit between said anode and cathode of each device, means to supply alternating voltage between the anodes and cathodes of said pair of electronic conduction devices in opposite phase, means to supply alternating voltage between the grid and cathode of both said devices in phase, said last voltage having the same frequency as said first voltage, and having phase relation different from said first voltage, means to indicate said phase relation, said means comprising a meter connected oppositely in said circuits and between said cathodes so that the current in one device flows through the meter in opposite direction from which the current in the other device flows therein, and means to vary said phase relation through a narrow range.

5. In a phase indicating device, the combination of a pair of gaseous conduction devices, each having an anode, a cathode, and a control electrode, respective circuits between the anode and cathode of each of said devices, means to supply a reference alternating voltage between the anodes and cathodes thereof in opposite phase, means to supply a second alternating voltage of the same frequency between said cathode and control electrode of both of said devices in phase, said last alternating voltage being variable in phase throughout a range of three hundred and sixty degrees and a current measuring instrument connected oppositely and in common to each of said circuits of both of said devices to produce an indication of said phase relations throughout said range.

6. The combination, in a device for indicating the phase relation between two alternating electromotive forces of the same frequency having phase relation variable through a range in excess of one hundred and eighty degrees, of a pair of gaseous conductive devices each having a pair of input electrodes comprising a cathode and control electrode and a pair of output electrodes comprising said cathode and an anode, means to supply one of said electromotive forces between said input electrodes of both devices and to supply the other electromotive force between the output electrodes of both devices, one of said electromotive forces supplied to respective electrodes of both devices being of opposite phase, the other of said electromotive forces supplied to respective electrodes of both devices being cophasal and a phase indicating instrument connected between said cathodes of said pair of gaseous conduction devices to conduct the current flowing in said devices in opposite sense to produce an indication of any phase relation, within said range, existing between said two electromotive forces.

7. In a phase indication system employing a pair of gaseous discharge devices, each having an anode, cathode and control electrode, and in which voltage of one alternating source is supplied between the anodes and cathodes of said pair of devices in opposite phase and voltage from a different source of the same frequency but of phase variable with respect to the first source is supplied between said control electrodes and cathodes of said pair of devices in like phase, the method which comprises measuring the direction and magnitude of the difference in currents flowing between the anodes and cathodes of said two devices to determine the phase relationship of said voltages, and when said difference is zero varying the phase relation slightly to produce an abrupt increase in said difference, whereby the in phase from the opposite phase relation of said voltage is distinguishable by the direction of the resultant increase in current flow.

8. In a phase indication system employing a pair of gaseous discharge devices, each having an anode, cathode and control electrode, and in which voltage of one alternating source is supplied between the anodes and cathodes of said pair of devices in opposite phase and voltage from a different source of the same frequency but of phase variable with respect to the first source is supplied between said control electrodes and cathodes of said pair of devices in like phase, whereby when said voltages are substantially in phase the difference in currents flowing between the anode and cathodes of said two devices is maximum, and when the phase relation is varied continuously in one direction from said in phase relation, said difference first gradually decreases to zero, then abruptly increases to maximum in opposite direction then again gradually decreases to zero and again abruptly increases to maximum, the method which comprises measuring the magnitude and direction of said difference, and varying the phase slightly to produce said abrupt changes whereby the in phase relation is distinguishable from the opposite phase relation.

9. An arrangement for determining the phase difference between a pair of applied voltages having a phase displacement variable over 360 electrical degrees, comprising a pair of gaseous discharge devices, each of said devices having anode, cathode and control electrodes, a current measuring instrument, means for deriving out of phase voltages from one of said applied voltages, means for applying each of said out of phase voltages cophasally in series through said measuring instrument between the anode electrode and cathode electrode of a respective device, said voltages being applied to the different devices in opposite phase, and means for applying the other voltage of said pair cophasally between each of said control electrodes and a respective cathode electrode.

VARRO J. CLARKE.

REFERENCES CITED

The following references are of record in the file of this patent:

UNITED STATES PATENTS

| Number | Name | Date |
|---|---|---|
| 1,984,545 | Peterson | Dec. 18, 1934 |
| 2,085,595 | Livingston | June 29, 1937 |
| 2,217,477 | Gulliksen | Oct. 8, 1940 |
| 2,221,517 | Holters | Nov. 12, 1940 |
| 2,225,348 | Mikelson | Dec. 17, 1940 |
| 2,518,161 | McNaney | Aug. 8, 1950 |

FOREIGN PATENTS

| Number | Country | Date |
|---|---|---|
| 411,100 | Great Britain | May 28, 1934 |